United States Patent [19]

Kaji et al.

[11] Patent Number: 4,910,722
[45] Date of Patent: Mar. 20, 1990

[54] OPTICAL INFORMATION RECORDING AND REPRODUCING APPARATUS

[75] Inventors: Yoshiaki Kaji, Hachioji; Seiji Kitagawa, Ina, both of Japan

[73] Assignee: Olympus Optical Co., Ltd., Tokyo, Japan

[21] Appl. No.: 271,835

[22] Filed: Nov. 16, 1988

[30] Foreign Application Priority Data

Nov. 16, 1987 [JP] Japan .................. 62-290204

[51] Int. Cl.⁴ .................................. G11B 7/00
[52] U.S. Cl. ............................. 369/32; 358/907
[58] Field of Search ............... 358/312, 342, 907; 360/10.1; 369/32, 43, 44, 45, 46

[56] References Cited

U.S. PATENT DOCUMENTS

| | | | |
|---|---|---|---|
| 4,106,058 | 8/1978 | Romeas et al. | 369/32 |
| 4,403,259 | 9/1983 | Masaki | 358/342 |
| 4,510,531 | 4/1985 | Sugiyama | 358/342 |
| 4,535,439 | 8/1985 | Satoh et al. | 369/32 |
| 4,536,863 | 8/1985 | Giddings | 369/32 |
| 4,545,044 | 10/1985 | Satoh et al. | 369/32 |
| 4,550,393 | 10/1985 | Sugiyama et al. | 369/43 |
| 4,641,294 | 2/1987 | Yoshimaru | 369/32 |
| 4,689,778 | 8/1987 | Miura et al. | 369/32 |
| 4,734,793 | 3/1988 | Kaneko et al. | 358/342 |
| 4,761,772 | 8/1988 | Murakami | 369/32 |
| 4,814,897 | 3/1989 | Kojima et al. | 358/342 |

FOREIGN PATENT DOCUMENTS 57-37743 3/1982 Japan .

Primary Examiner—Donald McElheny, Jr.
Attorney, Agent, or Firm—Armstrong, Nikaido, Marmelstein, Kubovcik & Murray

[57] ABSTRACT

The optical information recording and reproducing apparatus of the present invention comprises a detecting device detecting that an optical disc-like recording medium, having a spiral track, has made one rotation. A track jump circuit moves the position of a light beam, radiated on one segment of the spiral track of the optical disc-like recording medium, to an objective track segment. A track jump correcting circuit corrects the position of the light beam by the number of tracks which is equal to the number of one-rotation detecting signals obtained from the detecting device during the movement by the track jump circuit. A kick back circuit holds the light beam to always be radiated on the objective track segment.

7 Claims, 4 Drawing Sheets

FIG. 4
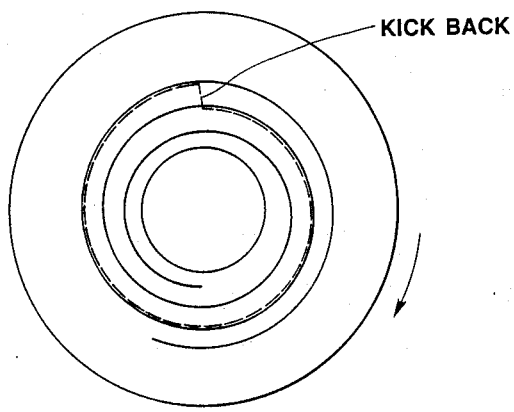
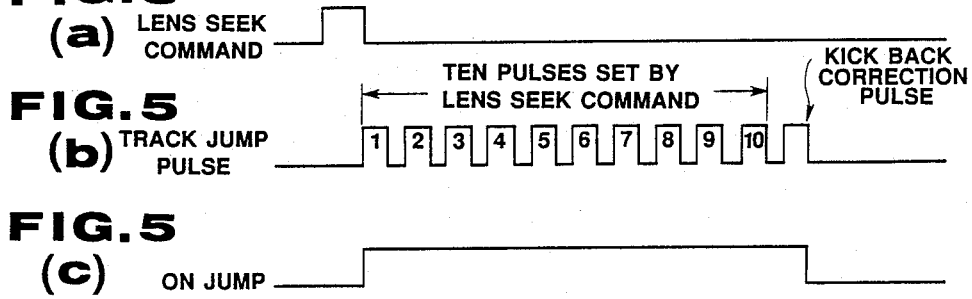
FIG. 5 (a) LENS SEEK COMMAND
FIG. 5 (b) TRACK JUMP PULSE
FIG. 5 (c) ON JUMP
FIG. 5 (d) MECHANICAL INDEX PULSE

OPTICAL INFORMATION RECORDING AND REPRODUCING APPARATUS

FIELD OF THE INVENTION

This invention relates to an optical information recording and reproducing apparatus provided with a track access means for an optical recording medium having a spiral track.

BACKGROUND OF THE INVENTION

Recently, an optical information recording and reproducing apparatus is used whereby information can be recorded and reproduced at a high density on an optical recording medium using a light beam from an optical pickup instead of recording and reproducing information using a magnetic head.

A disc-like recording medium (which shall be mentioned as a disc hereinafter) has tracks which are formed concentrically or spirally.

Now, as disclosed, for example, in a Japanese patent application laid open No. 37743/1982, conventionally, in case the number of tracks from the present track to an objective track (or desired track) is several tens of tracks, the optical pickup will access the objective track by a track jump. First of all, the controller will read the address number of the now held track (i.e., present track), will calculate a difference in address number from the address number of the objective track and will designate the value of the difference as a track jump command. When the track jump of the designated number ends, the coincidence of the address number of that track with the address number of the objective track will be confirmed and the access operation (seeking operation) will end.

Now, as shown in FIG. 1, in a spiral disc 1, as the track continues spirally, a different track number (address number) will be alotted in the position where one rotation has been made and the recording region is distinguished.

In a spiral disc, when a predetermined track is to be maintained, a mechanical index, provided in response to a position at which the track number is different, will be detected. The track will be maintained by making a kick back operation 2 of returning the pickup to the previous track position for each rotation as shown in FIG. 1.

However, in a spiral disc, when passing a region of a kick back while a track jump is being carried out, since the track jump is preferred to be made witout making a kick back, the number of tracks to reach the objective track will be different from the first designated number of tracks. For example, in FIG. 1, when seeking tracks Nos. 1 to 4, the number of jump commands will be 3. In such a case, as shown by a reference symbol A, in case a track jump is made outside a region in which a kick back is made, that is, a boundary in which the track number varies, an access to the objective track No. 4 will be able to be made but, as shown by a reference symbol B, if a track jump is made while passing through the region in which the track number varies, the track number will be 5 (rather than track number 4) after the track jump. Therefore, after the track jump ends, when the controller confirms the track address number, it will be different from that of the objective track and therefore a track jump command will have to be issued again to make a track jump. Therefore, there is a defect that a long time can occur until an access to the objective track is made.

OBJECT AND SUMMARY OF THE INVENTION

The present invention has as an object to provide an optical information recording and reproducing apparatus whereby a seek operation by a track jump can be ended within a short time without repeating a track jump command.

The optical information recording and reproducing apparatus of the present invention comprises a device for detecting the number of passages through a boundary region in which the track number of a spiral track changes while the present track is moving to an objective track by a track jump and a device for correcting a kick back by the number of passages during a track jump in the direction of a kick back after the above mentioned track jump. Thus, an objective track can be sought by one track seeking process irrespective of the passage through the track number changing point and without repeating the seeking process.

The other features and advantages of the present invention will be apparent with the following explanation.

BRIEF DESCRIPTION OF THE DRAWINGS

FIGS. 2 to 5 relate to an embodiment of the present invention.

FIG. 2 is a schematic formation diagram of the embodiment.

FIG. 3 is a formation diagram of a track jump circuit part.

FIG. 4 is an elevation showing a spiral disc.

FIG. 5(a-d) show an operation explaining diagram of the embodiment.

DETAILED DESCRIPTION OF THE PREFERRED EMBODIMENT

The present invention shall be explained with reference to the drawings:

FIGS. 2 to 5(d) show an embodiment of the present invention.

Figure 1:
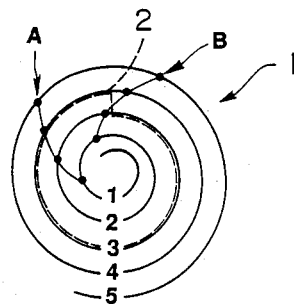
FIG. 1 is of a related art and is an explanatory view showing a manner of making a track jump in a spiral disc.
Figure 2:
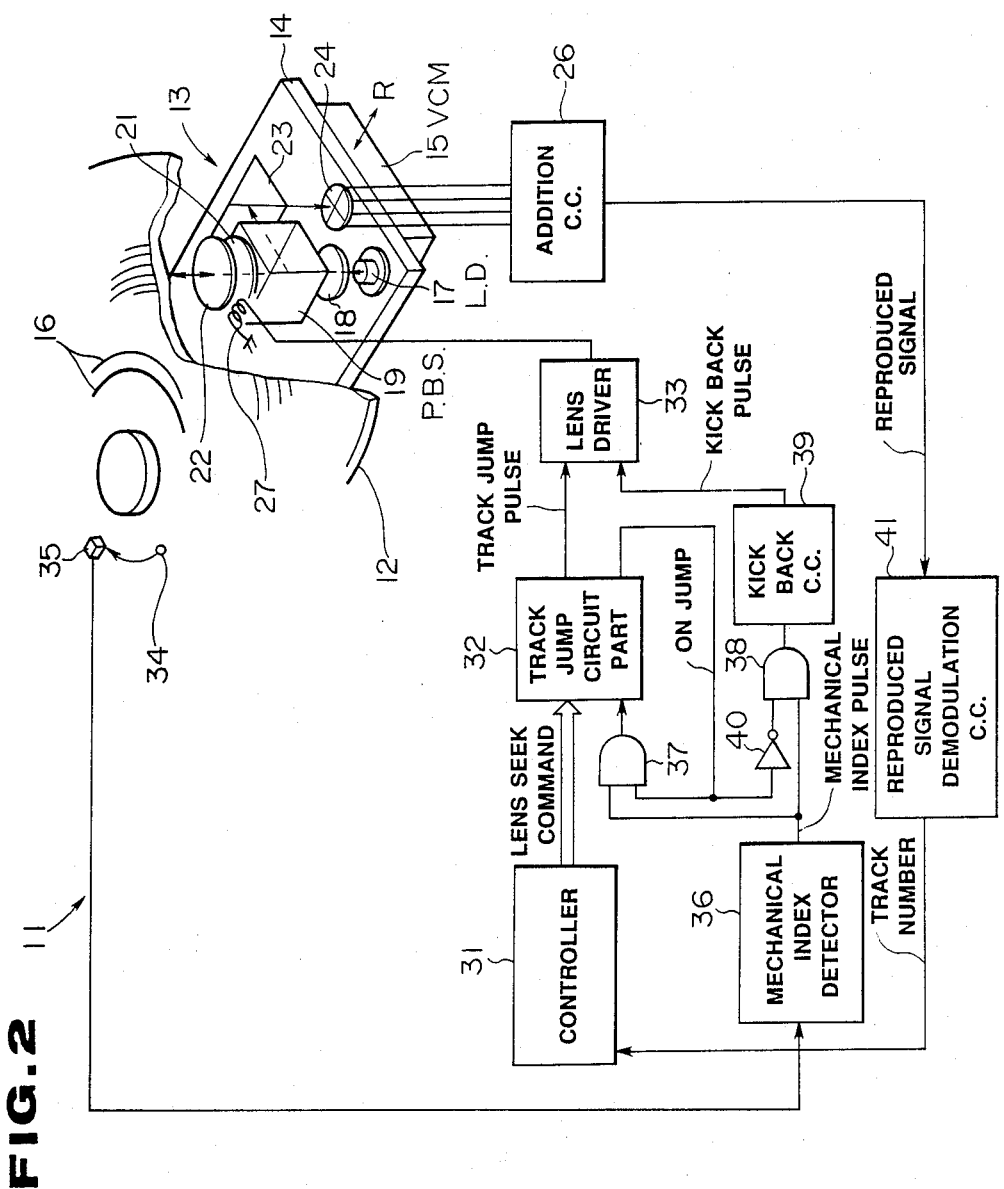

As shown in FIG. 2, in an optical information recording and reproducing apparatus 11 of the present invention, an optical pickup 13 is arranged opposed to one disc surface of a spiral disc 12 rotated by a spindle motor (not illustrated) and is made movable in a radial direction R of the spiral disc 12, (that is, in the direction of intersecting the spiral disc 12) together with a carriage 14 by a coarsely moving means such as a VCM (voice coil motor) motor. A spiral track is formed also on the surface to which the optical pickup 13 is opposed.

By the above mentioned pickup 13, light of a laser diode 17 is made into a parallel light beam by a collimator lens 18 and enters a polarized light beam splitter 19 as p-polarized light. The light, having substantially 100% passed through this polarized beam splitter 19, is made into circular polarized light by a ¼-wavelength plate 21, is further condensed by the condenser lens 22 and is radiated onto the spiral disc 12. The light reflected by the disc 12 passes through the lens 22 and is made into S-polarized light through the ¼-wavelength plate 21. The S-polarized light is substantially 100% reflected by the polarized light beam splitter 19 and enters a critical angle prism 23. The light reflected by the slope of the prism 23 is received by a photodetector 24 arranged in a far field position as opposed to the exit surface of the prism 23. The photodetector 24 is formed of a quarterly-divided light receiving device. A DC SUM signal, as a reproduced signal, is produced through an addition circuit 26. By passing the light through a reduction circuit, not illustrated, a tracking error signal or focus error signal is produced.

By applying a track jump pulse to a tracking coil 27 forming a lens actuator, the above mentioned objective lens 22 is made movable (track-jumpable) to the next track from the present track position in which the light beam is on-track.

The above mentioned track jump pulse is applied to the tracking coil 27 through a track jump circuit part 32 and lens driving circuit 33 based upon a command by a controller 31. By the controller 31, a light is radiated by the optical pickup 13 and is read out of a reproduced signal demodulating circuit 41. The difference between the present track number and the objective track number is calculated and the difference and direction are output to the track jump circuit part 32. The track jump circuit part 32 is a timing circuit wherein, in order that the number of tracks given by a track jump command may be jumped in a predetermined direction (that is, in an inner peripheral side or outer peripheral side direction), a track jump pulse is generated and is output to the lens driving circuit 33.

The lens driving circuit 33 is formed of an analogue driving circuit for driving the objective lens 22.

The above mentioned spiral disc 12 is provided with an index as, for example, a high reflection pattern 34. The index is used for detecting that the disc 12 has made one rotation, by a position sensor 35 such as a photoreflector. In case the disc 12 has made one rotation, when the pattern 34 is just below the position sensor 35, the sensor 35 will be able to detect the pattern. The output of the position sensor 35 is input into a mechanical index detecting circuit 36 so that, when the pattern 34 passes just below the position sensor 35, the mechanical index detecting circuit 36 will output a mechanical index pulse.

The above mentioned position sensor 35 is arranged so as to be just above the pattern 34 when the boundary region, i.e., where the track number on the disc 12 varies, is in the state of being read out by the optical pickup 13. That is to say, when the optical pickup 13 reads out that the track number has varied, the position sensor 35 will detect the high reflection pattern 34.

The mechanical index pulse output from the above mentioned mechanical index detecting circuit 36 is input into the track jump circuit part 32 through an AND-gate 37 and into a kick back circuit 39 through a second AND-gate 38.

With the kick back circuit 39, a kick back pulse for the kick back operation, which is synchronized with the input mechanical index pulse, is generated and is output to the lens driving circuit 33. With the lens driving circuit 33, using the track jump pulse output from the track jump circuit part 32, the objective lens 22 is moved and the beam spot condensed and radiated by the objective lens 22 is jumped and moved from the present track to another desired track. When a kick back pulse is input from the kick back circuit 39, the beam spot will be moved from the adjacent track and will be returned to the original track. (In the tracking state in this embodiment, as shown in FIG. 4, the beam spot is moved in the outer peripheral direction which is determined by the spiral direction and rotating direction. Therefore, in order to correct the moving direction, after one rotation, the beam spot is moved to the inner peripheral side track.)

With the kick back operation, the beam spot will be held in the state of always following the same track number. However, when the kick back operation is stopped the beam spot will spirally scan the track with the rotation of the disc 12.

During the track jump operation, the above mentioned track jump circuit 32 will output an ON-JUMP signal of an "H" level. The ON-JUMP signal is input into the AND gate 37 so that, while the ON-JUMP signal is being output, a mechanical index pulse will be input and a track jump will be made by taking the number of pulses of the mechanical index pulse into consideration (by increasing or decreasing the correcting track jump pulses).

The ON-JUMP signal is also input into the kick back circuit 39 through an inverter 40 and the AND gate 38 so that, during the ON-JUMP signal, no kick back operation will be made.

That is to say, during the ON-JUMP signal, the kick back operation will be suspended, the number of pulses of the mechanical index pulse during the suspension, that is, the number of variations of the track number, will be counted by the track jump circuit 32, the number of track jump pulses will be increased or decreased (added or reduced in response to the direction of the track jump or the like) by the number of variations of the track number and an access to the objective or desired track may be made by one lens seeking command.

A reproduced signal output from the above mentioned adding circuit 26 is input into a reproduced signal demodulating circuit 41. The encoded reproduced signal is demodulated and a track number signal of an ID part of the disc 12 is input into the controller 31. That is to say, using the track number signal, the controller 31 detects the present track number and outputs to the track jump circuit part 32 a lens seeking command when an access to the objective track is input.

Figure 3:
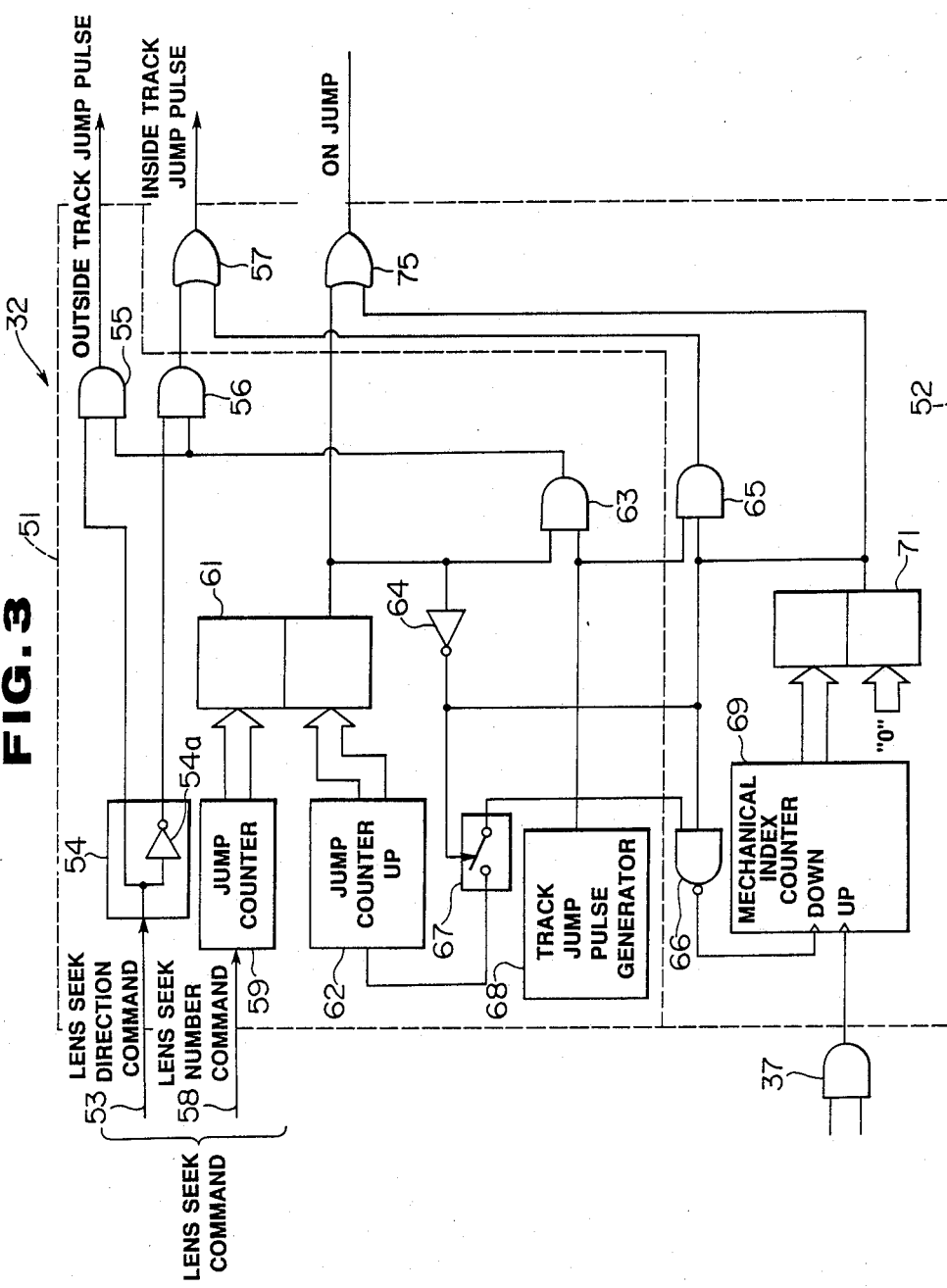

A formation of the above mentioned track jump circuit part 32 is shown in FIG. 3.

The track jump circuit part 32 comprises a track jump circuit 51 making a track jump in response to a lens seeking command from the controller 31 and a track jump correcting circuit 52. The number of variations of the track number during the track jump operation is detected by using a mechanical index pulse. A kick back correcting pulse is output as a jump pulse following the track jump by the above mentioned track jump circuit 51 and a jump operation for making a kick back correction is made.

A lens seeking direction command 53, in the lens seeking command from the above mentioned controller 31, is input into a seeking direction setting circuit 54. The controller determines whether the difference between the objective track number and the present track number is positive or negative. For example, in case the difference is positive, the lens seeking direction command will output an outside track jump pulse (directed toward the outer periphery) through an AND gate 55. On the other hand, if the difference is negative, the controller will output an inside track jump pulse (directed toward the inner periphery) through an AND gate 56 and OR gate 57.

A track jump pulse is formed from the above mentioned outside track jump pulse and inside track jump pulse. On the other hand, a lens seeking number command 58 is determined by the absolute value of the difference between the present track number and the objective track number and is input into the first jump counter 59. The number of tracks to be moved is then set as a counted value and the counted value is input into a first coincidence circuit 61 which senses whether the counted value coincides with the counted value of the second jump counter 62. The first coincidence circuit 61 will be "H" for coincidence but will be "L" when no coincidence. The output of the coincidence circuit 61 is output as an ON-JUMP signal through an OR gate 75. The output of the coincidence circuit 61 is also input into an AND gate 63 and into an AND gate 65 and 3-input NAND gate 66 through an inverter 64 and is applied to a switch 67 at the ON-OFF controlling end. The switch 67 will close when the output of the first coincidence circuit 61 is "L", that is, at the time of no coincidence but will open at the time of coincidence. When the switch 67 is closed, the track jump pulse from a track jump pulse generating circuit 68 will be input into the jump counter 62. With the track jump pulse generating circuit 68, a track jump pulse is generated at regular intervals and is input into the AND gates 63 and 65 and NAND gate 66. The output of the AND gate 63 is input into the AND gates 55 and 56 and the output of the AND gate 65 is input into the OR gate 57. The AND gate 65 is to output a kick back correcting pulse (output as an inside track jump pulse output through the OR gate 57) successively after the lens seeking number command 58 is carried out. (See the track jump pulse in FIG. 5.)

The above mentioned 3-input NAND gate 66 will output a down pulse to a mechanical index counter 69 only when the output of the coincidence circuit 61 coincides. The output of the AND gate 37, that is, a mechanical index pulse in the ON-JUMP signal is applied to the mechanical index counter 69 at the up count input end. The counted output of the mechanical index counter 69 is applied to the second coincidence circuit 71 at one input end which senses whether the counted output coincides with the "O" value applied at the other input end thereof. The output of the coincidence circuit 71 is input into the 3-input AND gate 65, 3-input NAND gate 66 and an OR gate 75. When the respective output signals of the two coincidence circuits 61 and 71 are input into the OR gate 75, the gate 75 will continue to output ON-JUMP signals until these coincidence circuits 61 and 71 coincide with each other. The above mentioned index counter 69 counts up the mechanical index pulses through the AND gate 37 and makes an inside track jump for the number of tracks corresponding to the pulses to correct the kick back operation. Even if the mechanical index pulse is input while the kick back correcting pulse is being output, when the pulses are counted down at the rear edge of the pulse, the counter 69 will be able to be up until the correcting pulse is output to the end.

In the 3-input AND gate 65, after the end of the track jump of the lens seeking command number, when the output of the inverter 64 becomes "H", the output of the second coincidence circuit 71 will be "H", that is to say, the mechanical index pulse will continue to make the inside track jump pulse of the counted number of tracks.

The operation of the thus formed first embodiment shall be explained in the following:

In case there is no access command from the controller 31, a tracking servo system will be making a kick back by moving one track to the inner peripheral side of the disc 12 once in one rotation in order to hold the track at the present point. This is shown in FIG. 4. The timing of the kick back is made by a kick back pulse output by the kick back circuit 39 from the mechanical index pulse output by the mechanical index detecting circuit 36 by sensing the pattern 34 after the position sensor 35 shown in FIG. 2. In this state, the lens driving circuit 33 will be switched from the output end of the track jump circuit part 32 to the tracking servo system side by a switch (not illustrated) and will scan the same track. In such a case, a two-step servo state will be set by the VCM 15 and the tracking servo system.

When an access mode seeking an objective track is set, in case the objective track is far away from the present track position, a coarse access will be made by the VCM 15. In case the objective track is near the present track position, the lens 22 will be moved to make a close access. This close access is made according to this first embodiment.

For example, with a lens seeking command, the number of lens seekings is 10 and there is a timing of making a kick back while the lens seeking is being carried out. A timing chart of this example is shown in FIG. 5(a–d).

The timing of making a kick back is synchronized with the mechanical index pulse, is generated once in one rotation and is not synchronized with the lens seeking.

Shown in FIG. 5(a) is a lens seeking command output from the controller 31. As shown in FIG. 5(b), the track jump circuit part 32 outputs a number of track jump pulse (that is, 10) commands which are delivered to the lens driving circuit 33. At the same time, as shown in FIG. 5(c), an ON-JUMP signal is output. In the lens driving circuit 33, according to the track jump pulse, a voltage for moving one track is output to the lens 22 to carry out a track jump. When the ON-JUMP signal is at a "H" level, it will pass through the AND gate 37 and the mechanical index pulse will be able to be input into the track jump circuit part 32. For example, when passing through a track position in which the track number varies while the track jump is being carried out, as shown in FIG. 5(d), a mechanical index pulse will be output and will be counted and held in the track jump circuit part 32. Track jump pulses of the above mentioned set number will be delivered, and track jumps equal to the number of the counted and held mechanical index pulses will be made to the inner peripheral side of the disc. Then, the above mentioned counted value will be set and the ON-JUMP signal will be on an "L" level. While a track jump by the lens seeking is thus being carried out, even if passing through the position in which a mechanical index pulse is output, the number of the passages of the mechanical index pulse will be detected, a kick back correction will be made by track jumps by the number of passages following the ordinary track jump and therefore, after this track jump is carried out, an access to the objective track will be able to be made. Therefore, it is not necessary that, in the conventional example, after the lens seeking, the track number of the ID part of the track is read out, the residual part to make a track jump by the mechanical index pulse part is recognized and a track jump must be made again.

When the above mentioned ON-JUMP signal is at the "H" level, the AND gate 37 will be closed and no mechanical index pulse will be input into the track jump circuit part 32. At the same time, the mechanical index pulse can be input into the kick back circuit 39 through the AND gate 38. When the mechanical index pulse is input, a kick back operation will be made.

According to this first embodiment, by one lens seeking command, following the ordinary track jump, a track jump for the kick back correction can be made (successively) and therefore an access can be made to the objective track without repeating the lens seeking operation. Therefore, an access can be made to the objective track within a short time.

In the above mentioned first embodiment, in case, as shown in FIG. 4, the optical disc 12 is rotated and driven clockwise from the inner periphery to the outer periphery and, on the other hand, the spiral is counterclockwise from the inner periphery to the outer periphery, a track jump will be made to the inner peripheral side to make a kick back correction. Even in case the spiral direction is different, a correction pulse will be made in the direction of making the kick back. In case the kick back is made in the outer peripheral direction, the OR gate 57 in the track jump correcting circuit 52 in FIG. 3 may be interposed on the output side of the AND gate 55 instead of the output side of the AND gate 56.

FIG. 3 shows an embodiment of the track jump circuit part 32 which may be made of a different formation. When a mechanical index pulse is sensed by using a CPU, the number of pulses may be held and a kick back correcting pulse may be output following the ordinary track jump.

The formation of the optical pickup is not limited to that shown in FIG. 2.

The position sensor 35 setting position may be arranged on the somewhat front side from the boundary in which the track number varies so that, when the position sensor 35 senses the pattern 34, the track jump operation will be suspended, a kick back operation will be made and, after the kick back operation, the remaining track jump operation may be made again.

As described above, according to the present invention, during lens seeking, the passages of the mechanical index will be counted and, after the jumps by the number set by the lens seeking command end, the lens seeking will be made in the same direction as the kick back by the number of passages of the mechanical index and therefore the access can be completed without the recognition of the ID.

What is claimed is:

1. An optical information recording and reproducing apparatus comprising:
   a detecting means for detecting one rotation of an optical disc-like recording medium having a spiral track which is divided into a plurality of track segments;
   a track jump means for moving a position of a light beam from radiating on a present track segment on said optical disc-like recording medium to radiating on a desired objective track segment;
   a track jump correcting means for correcting the position of said light beam by a number of track segments which is equal to a number of one-rotation detecting signals which is detected by said detecting means during movement of said track jump means; and
   a kick back means for holding said light beam on the desired objective track segment of said plurality of track segments on said optical disc-like recording medium.

2. An optical information recording and reproducing apparatus according to claim 1 wherein said detecting means comprises a sensor which detects passing an index which is provided on said optical disc-like recording medium and a detecting circuit which receives a signal from said sensor and outputs said one-rotation detecting signal to said track jump correcting means and said kick back means.

3. An optical information recording and reproducing apparatus according to claim 2 wherein said index is a high reflection pattern.

4. An optical information recording and reproducing apparatus according to claim 1 wherein said track jump correcting means receives said one-rotation detecting signal while said track jump means is moving said light beam from the present track segment to the desired objective track segment.

5. An optical information recording and reproducing apparatus according to claim 1 wherein said track jump correcting means receives said one-rotation detecting signal, holds the number of track segments equal to the number of said one-rotation detecting signals and corrects the number of track segments to be equal to the number of said one-rotation detecting signals after the light beam is moved by said track jump means.

6. An optical information recording and reproducing apparatus according to claim 1 wherein said kick back means cannot receive said one-rotation detecting signal while said track jump means and said track jump correct means are operating and said kick back means again receives said one-rotation detecting signal after said track jump means and said track jump correcting means finish operating so that the desired objective track segment is always illustrated with said light beam.

7. An optical information recording and reproducing apparatus according to claim 6 wherein said kick back means receives said one-rotation detecting signal and moves said light beam by one track segment.

* * * * *